US008359407B2

(12) United States Patent
Van Bebber

(10) Patent No.: US 8,359,407 B2
(45) Date of Patent: Jan. 22, 2013

(54) METHOD AND DEVICE FOR ACTIVATING FUNCTIONS OF A POWERED-OFF DEVICE VIA A SERIAL DATA BUS INTERFACE

(75) Inventor: Achim Van Bebber, Bochum (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/443,180

(22) PCT Filed: Sep. 26, 2006

(86) PCT No.: PCT/IB2006/002661
§ 371 (c)(1),
(2), (4) Date: Apr. 20, 2010

(87) PCT Pub. No.: WO2008/038057
PCT Pub. Date: Apr. 3, 2008

(65) Prior Publication Data
US 2010/0281183 A1 Nov. 4, 2010

(51) Int. Cl.
*G06F 3/00* (2006.01)
(52) U.S. Cl. .............. 710/7; 710/8; 710/10; 710/11; 710/13; 710/14; 710/15; 710/20
(58) Field of Classification Search .............. 710/7, 8, 710/10, 11, 13, 14, 15, 20
See application file for complete search history.

(56) References Cited

U.S. PATENT DOCUMENTS

| | | | | |
|---|---|---|---|---|
| 6,663,420 B1* | 12/2003 | Xiao | ............... | 439/502 |
| 2002/0038432 A1* | 3/2002 | Hsu | ............... | 713/300 |
| 2003/0167318 A1* | 9/2003 | Robbin et al. | ............... | 709/221 |
| 2005/0267999 A1* | 12/2005 | Suematsu et al. | ............... | 710/14 |
| 2006/0135138 A1* | 6/2006 | Lazaridis | ............... | 455/417 |
| 2006/0160569 A1* | 7/2006 | Chen et al. | ............... | 455/557 |
| 2006/0181241 A1 | 8/2006 | Veselic | ............... | 320/107 |
| 2006/0199435 A1* | 9/2006 | Foo et al. | ............... | 439/638 |
| 2006/0221776 A1* | 10/2006 | Roman et al. | ............... | 369/1 |
| 2008/0054855 A1* | 3/2008 | Hussain et al. | ............... | 320/162 |
| 2008/0119159 A1* | 5/2008 | Ruff et al. | ............... | 455/343.1 |
| 2011/0055615 A1* | 3/2011 | Kubo et al. | ............... | 713/340 |

FOREIGN PATENT DOCUMENTS

| | | |
|---|---|---|
| EP | 0 720 305 A2 | 7/1996 |
| EP | 1 553 480 A1 | 7/2005 |
| JP | 2001-069388 | 3/2001 |
| WO | WO-2005/078555 A1 | 8/2005 |

OTHER PUBLICATIONS

"Universal Serial Bus Mass Storage Class Specification Overview", Afshar, et al., Revision 1.2, Jun. 23, 2003, 7 pgs.
"Reduced Block Commands (RBC)—Draft Proposal (T10/97-260r2)", Bryan, Michael, Revision 1, Jan. 16, 1998, 34 pgs.
"Common SCSI/ATAPI Command Set For Streaming Tape", QIC Development Standard, QIC157 Revision D, Dec. 13, 1995, 64 pgs.

* cited by examiner

*Primary Examiner* — Chun-Kuan Lee
*Assistant Examiner* — Jasjit Vidwan
(74) *Attorney, Agent, or Firm* — Harrington & Smith

(57) ABSTRACT

A method and device are provided for activating certain functions of a powered-off device having a serial data bus interface when it is attached to a powered device via the serial bus interface. On detection of a voltage on the power line of the serial bus, the processor of the device is booted in a special operation mode, wherein certain functions of the serial data bus interface can be used without powering the complete device. The device may then be enumerated by the attached host device and for example allow access to its memory unit or use the power signal on the serial bus interface for battery charging.

19 Claims, 2 Drawing Sheets

METHOD AND DEVICE FOR ACTIVATING FUNCTIONS OF A POWERED-OFF DEVICE VIA A SERIAL DATA BUS INTERFACE

RELATED APPLICATION

This application was originally filed as PCT Application No. PCT/IB2006/002661 filed Sep. 26, 2006.

FIELD OF THE INVENTION

This invention relates to a device having a serial data bus interface, and in particular to a device and a method for activating certain functionalities of such a device via its serial data bus interface when powered off.

BACKGROUND ART

Many electronic devices are arranged to be connected to another device, such as a personal computer, laptop computer, or a printer, for data communication. Some examples for such devices are handheld computers, digital cameras, media players, or mobile phones. The connection to a PC or some other device is frequently effected via a serial data communication bus.

A serial data bus interface usually includes at least one data line, a ground line and a power line. Additional pins and lines may be present. In most cases a device is allowed to draw power from the power line on the interface. The purpose of this power supply is that devices with limited power consumption would not need to have an additional power supply for operation with the host device. For the example case of the Universal Serial Bus (USB) standard, specifications define how much power may be consumed by a device and under what conditions power may be drawn. Usually a specific connection procedure compliant with a respective standard is required before the serial bus can be used for data communication or for supplying power.

As most devices as mentioned above use a battery or rechargeable battery as a mobile power source, power consumption and recharging of batteries are important design considerations. The power supplied on a serial data bus might be used to recharge a battery utilizing the same interface and connection that are used for data communication through the bus.

A variety of electronic devices include some security or authentication lock, such as a personal identification code or password a user has to enter before he can access and utilize the device. This is a common feature for e.g. mobile phones, where a security lock is usually implemented via a numerical PIN code that has to be entered when the phone is powered on. If a user does not enter a valid PIN code, the various functions of the phone cannot be used.

If a user only needs limited access to a device, it is not always necessary to provide complete functionality for all units and elements of the device. For example, charging of an internal device battery or transferring data from the device memory via the serial bus interface does not require complete access to all functions and processes the device is capable of Besides the fact that handling would be easier and faster (for both the user and an external device connected for charging or data transfer) when no elaborate activation procedures have to be followed, also power consumption may be considerably lower when only part of a device is activated. However, to access and use a serial data bus interface such as USB, the device has to be powered on as described to be able to authenticate or initializes according to any predefined standard procedures.

SUMMARY OF THE INVENTION

A method is provided for a powered-off device for entering a device operation mode with special functionality upon connecting a powered device via a serial data bus.

This is in one embodiment achieved by a method comprising connecting a powered-off first device to a second device via a serial data bus interface, said first device being operable in at least a full first operation mode and a second operation mode; providing a voltage from said second device to said first device via said serial data bus interface; said first device detecting said voltage provided at said interface; activating a processing unit of said first device in response to said detected voltage; and entering said second operation mode in said first device. This allows a non-powered device to be partly activated in response to a power signal detected on its serial data bus interface, not requiring any further activation procedure from a user. The second operation mode may e.g. be a limited operation mode, providing only reduced functionality of the device compared to the first full mode, or a operation mode providing partially or completely different functions than the standard operation mode.

In certain embodiments, said initializing of a second operation mode in said first device further comprises communicating a set of parameters to said second device; and receiving a selected one of said set of parameters from said second device. These parameters may e.g. be used for configuration of the device.

According to exemplary embodiments of the invention said set of parameters includes at least one current value, which could be used to configure for a battery charging process.

In various embodiments of the invention, the method further comprises initializing data communication between said first and second devices via said serial data bus interface. Such a initialization is for example known in the USB standard as enumeration, but may also be present in any other serial bus communication.

In some embodiments the serial data interface may be operated according to the Universal Serial Bus Standard and initializing of data communication may comprise an enumeration according to the Universal Serial Bus standard. This standard is widespread for mobile and fixed terminals to allow for easy data communication between devices.

According to exemplary embodiments, said enumeration is performed in accordance with the USB mass storage device class protocols. These protocols are also supported by a large number of devices and ensure easy memory storage access via the USB connection.

Optionally said second operation mode may comprise providing access to a memory element of said first device; and enabling data communication of data stored at said memory element to said second device via said serial data bus interface.

Furthermore, said second operation mode may in certain embodiments comprise activating at least part of a visual display element; and displaying a current state of at least one functionality that is provided in said second operation mode. The state of such a functionality may be shown as a symbol that a user may identify, by a text or optionally by a combination of both.

In some embodiments of the invention the charging level of a rechargeable battery of said first device is indicated on said visual display element. The indication may include a scroll bar or a charging symbol, or some other continuous or non-continuous information about the charging process and/or the current battery level.

In various embodiments, presence of an ongoing data communication via said serial data interface is indicated on said visual display element. This allows a user to see that data is currently transferred such that he will not detach the connection.

The method according to some embodiments of the invention may further comprise initiating a charging process for a rechargeable battery of said first device, wherein said charging process uses a current supplied by said second device via said serial data interface.

Optionally said charging process may be performed using said received selected one of said set of current values as a maximum charging current. Thus, the connected device may choose the most suitable value and the charging will then be performed according to the selected value.

As a further aspect of the invention, a computer program product stored on a computer readable medium is provided, arranged to perform any of the method steps as stated above when executed on a processor.

According to another aspect of the present invention, a device is provided comprising: a serial data bus interface, including a power line, a ground line and at least one data line; a processing unit; a controlling unit capable of detecting a voltage at said power line in a powered-off state of said device, and further capable of activating said processing unit in a second operation mode in response to a detected voltage.

The device may in some embodiments further comprise at least one data storage unit, wherein said second operation mode is arranged to enable access for an external device to said data storage unit via said serial data bus interface.

Certain embodiments of the device may further comprise a memory card slot, wherein said data storage unit is a removable memory card operably inserted into said memory card slot.

Alternatively or additionally, said data storage unit may be an integrated memory element of said device in various embodiments of the invention. This could be a integrated flash memory, a hard drive, or some other fixed volatile and/or non-volatile memory element.

According to exemplary embodiments of the invention the device may comprise a rechargeable battery, and an energy management unit connected to said battery and said processor, and arranged to initiate and control a charging process for said rechargeable battery.

In some embodiments said energy management unit comprises circuitry capable of connecting or disconnecting said battery to said power line of said serial data bus interface. This will allow the energy management to start and stop a charging process when appropriate conditions are met.

Exemplary embodiments of the device may further comprise a visual display connected to said processor, and said display may be arranged to indicate a current state of at least one functionality provided in said second operational mode.

The device may according to some embodiments further comprise a radio communication unit for communicating in a cellular network. A cellular communication device could thus also be activated in part by its serial data bus interface.

In certain embodiments of the invention said radio communication unit is arranged to remain deactivated in said second operation mode. Thus, only necessary functions are activated and the radio communication unit cannot be accessed in this mode.

According to exemplary embodiments of the invention said serial data bus interface is operated according to the Universal Serial Bus Standard.

As another aspect of the invention, a device is provided comprising a processing means; means for connecting to a second device via a serial data bus interface; means for detecting a voltage provided at said serial data bus interface in a powered-off state; means for activating said processing means in response to said voltage detecting; and means for entering a second operation mode.

Some embodiments of the device may further comprise means for indicating a voltage state of at least one functionality that is provided in said second operation mode. The indicated state may e.g. be a battery charging level, a data transmission indication or some other information.

BRIEF DESCRIPTION OF FIGURES

In the following, exemplary embodiments of the invention will be described in more detail, with reference to the accompanying figures, wherein.

DETAILED DESCRIPTION OF EXEMPLARY EMBODIMENTS

In the following, some exemplary embodiments of the invention will be discussed in more detail. In certain cases, explanations will be given with regard to USB (Universal Serial Bus) interfaces as a common example of a serial data bus. However, all features and procedures also apply to devices having and methods using any other serial data bus interface. The invention is not limited to any specific standard, device type and design, or interface implementation.

Figure 1:
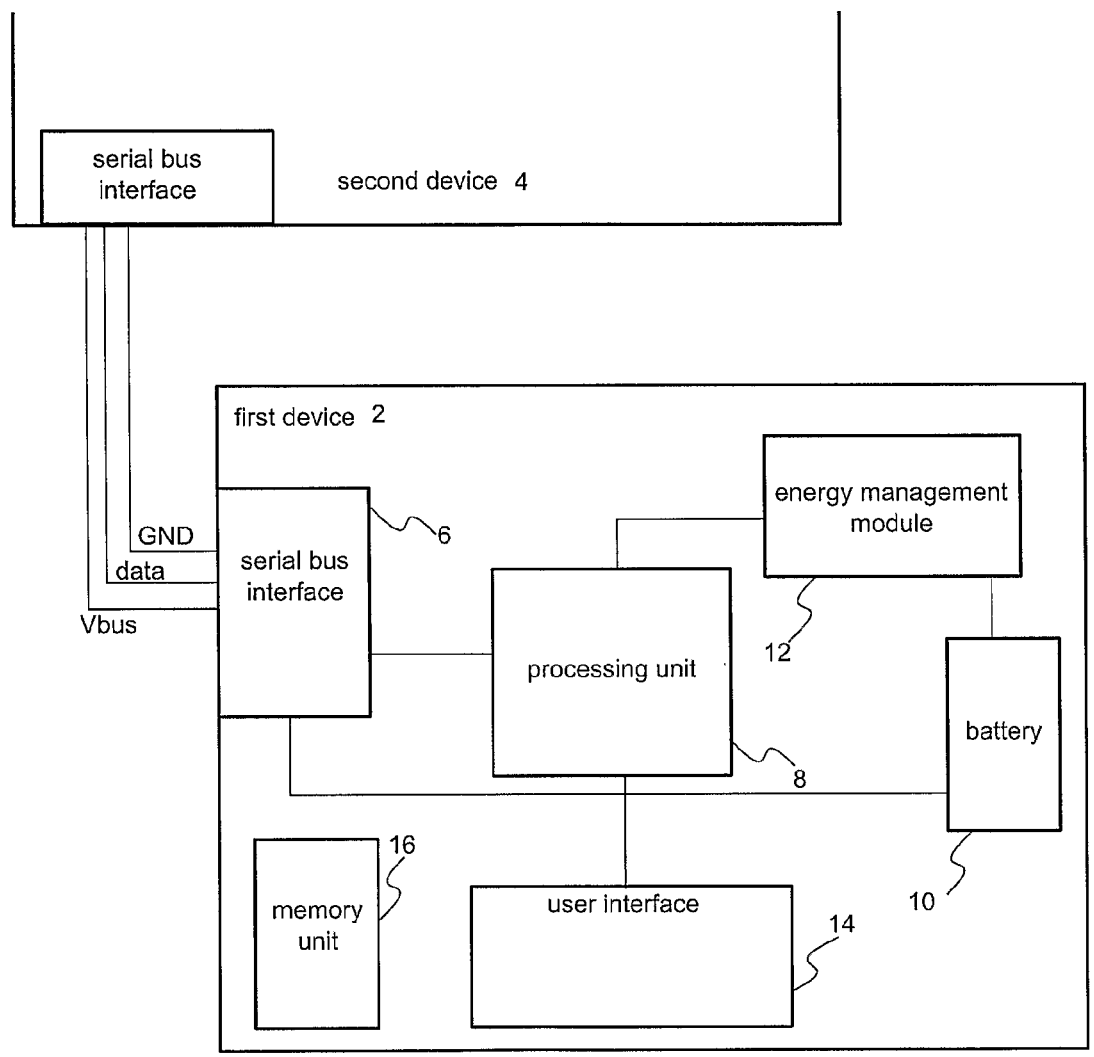
FIG. 1 is a schematic representation of an exemplary device according to the invention.

FIG. 1 illustrates a schematic structure of an exemplary device according to the invention. A device 2 having a serial data bus interface may connect to further devices 4 with similar interfaces for data signaling and/or power supply. The serial data bus 6 usually includes at least one data line DATA, a power line VBUS and a ground line GND. Further data lines or lines intended for other purposes may be present. Each device may connect to a hub such as a device 4 which may have a number of downstream facing ports for several devices as well as an upstream facing port in direction of the host. A hub that is included at the host and provided with a controller, referred to as a root hub, only has downstream facing ports. Devices that do not themselves serve as hubs only provide an upstream facing port. For some serial data bus architectures, there is not necessarily a host/peripheral structure, but two devices with essentially equal capabilities may be interconnected by a serial bus connection. Also, several devices may have both downstream and upstream bus ports and may then be cascaded. A hub or host may be designed as a standalone element for connection to some other device or alternatively be integrated into units such as a personal computer, printer, monitor, or any other suitable apparatus. A hub (or any other similar structure) may be self-powered or bus-powered, that is, it may be powered by its own power supply (self-powered) or through the bus of the host device such as a computer. The required power may for example be provided via a mains connection or a rechargeable or non-rechargeable battery.

Features and details for the USB standard, which may be used in exemplary embodiments, are specified in the "Universal Serial Bus Specification", Revision 2.0 of April 2000, available from the USB implementers forum, which is hereby incorporated by reference.

Devices with serial data bus interfaces may serve various different purposes. They may be used for data processing such as computers and handheld personal assistants, for media playback of video or audio data, for data storage such as card readers and flash drives, for mobile communication such as a cellular phone, and much more. This listing is not intended to be complete, and many other devices are known in the art that are or could be equipped with at least one serial data bus interface. Therefore, any further elements and units integrated in such devices may also differ from case to case. In some embodiments using the invention, a user interface 14 may be included which may comprise different elements for user interaction. Examples are keypads, buttons, scroll wheels, microphones and elements for speech recognition, or any further means suitable for user inputs; visual display elements and/or speakers for audio output, or any other means to indicate information to a user.

One or more processing units 8 (processors) may be provided that may exercise a plurality of functions. They will be used for processing data, executing software program code modules stored in memory, and in general controlling and conducting many or all of the functions of the device. Thus, the central processor 8 is usually connected to many other units of a device, such as the user interface 14, data interfaces, or energy management units 12. Further processing units or controllers may be included for specific functions of the device (not shown).

To store such software modules and other data permanently or temporarily, one or more memory elements 16 may be included in the device. This may e.g. be a integrated memory comprising software to be executed by the processing unit 8 for various device functionalities and databases, or removable data storage units such as memory cards. Card slots may be provided to insert certain types of replaceable memory cards, such that a user can flexibly exchange data between devices and easily extend storage capabilities of the device. Data may be received from data communication interfaces on the device and stored in memory, or also retrieved from memory and transmitted via one of the interfaces to some other element.

Usually, a device will include a power supply 10 and/or a interface for an external power supply. An internal power supply may for example be a rechargeable or non-rechargeable battery 10 that could optionally be replaceable. To allow recharging of the battery 10 when integrated into the device 2, a connection to an external charging interface may be provided. In case of a serial bus interface 6 having a dedicated power line VBUS or generally a line that is capable of providing electrical power, the battery 10 may be connected to this line for charging purposes, optionally including further circuit elements. In addition, certain embodiments may comprise a special energy management unit 12 that may for example be capable of controlling any aspects of charging processes, power saving and many more. Such an energy management unit 12 may include software portions, hardware portions such as integrated circuits, or a variable combination of both. The energy management unit 12 may be coupled between the rechargeable battery 10 and the power input interface, and may additionally be connected to the device's central processing unit 8 or any other units included in a device. Certain energy management processes may optionally and partially be user controlled.

Figure 2:
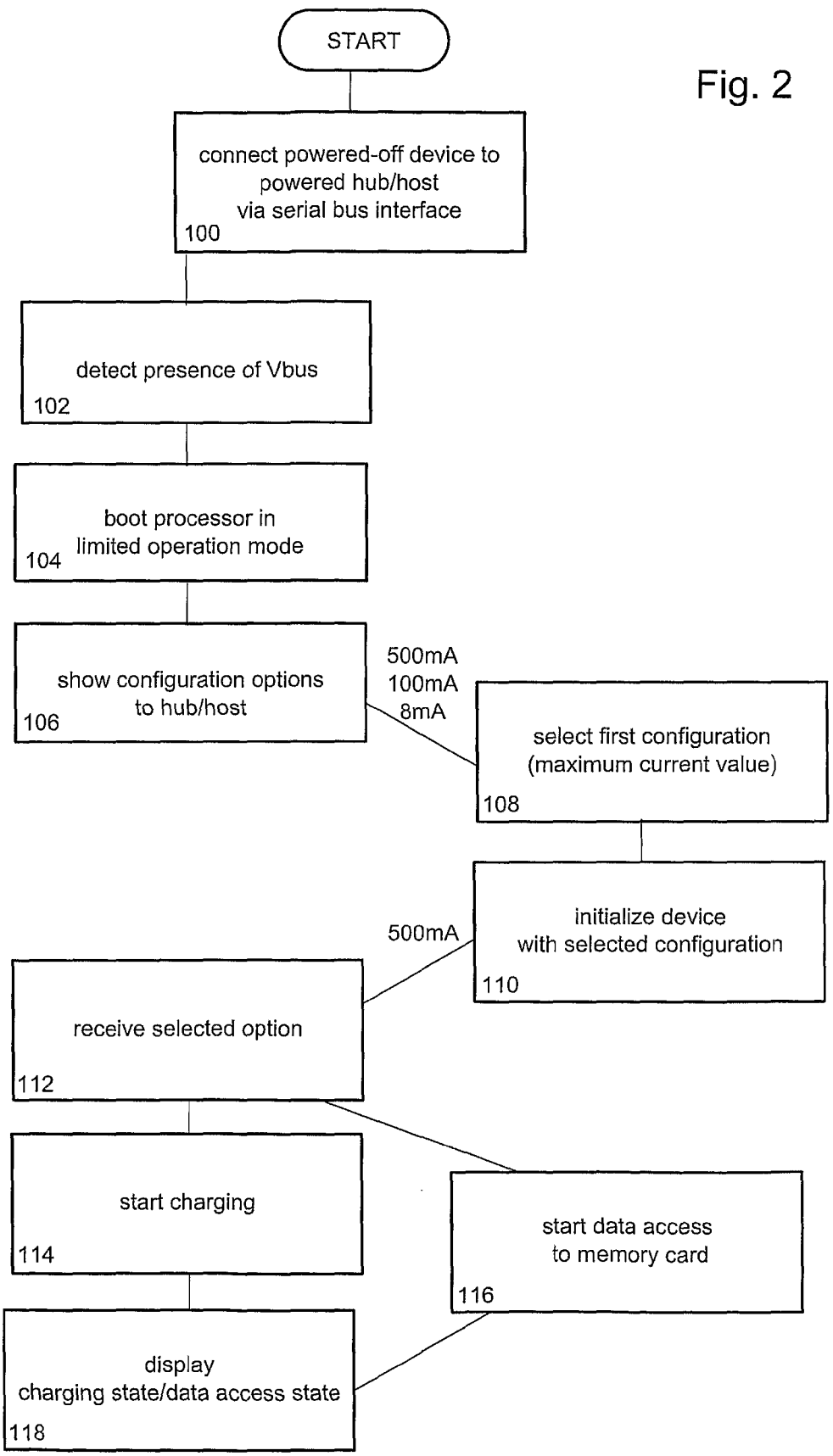
FIG. 2 shows a flow chart of an exemplary method according to the invention.

FIG. 2 shows method steps according to various exemplary embodiments of the invention. A first device 2 and a second device 4 both having a serial data bus interface are provided. The first device is powered off, while the second one is powered on. As an example, the second device may be a powered USB hub/host on a personal computer and the first device may be a mobile phone having a USB port or another serial port for data communication and charging purposes. Now, both devices are interconnected through their serial data bus interfaces 6 in step 100. Since the second device is active and powered on, it may provide a voltage and current on the power line of the serial bus interface. For a USB compliant example embodiment, maximum current ratings are given by the USB standard.

A detection circuit of the first device may then activate certain parts of the first device in response to a voltage detected in step 102 on the connected power line of the serial bus port. The entered second operation mode may in exemplary embodiments include booting a device processor (step 104) for executing one or more software elements. Any elements and units which are not needed for a specific desired function do not need to be activated. For example, any user interface elements such as display or input elements could remain deactivated or only perform limited functions. As a further example, a mobile phone might not be allowed to use its radio communication interface. In this second operation mode, the processor may also optionally be operated on a lower clock rate than usual or possible. In exemplary embodiments, the second operation mode may not be indicated to a user in any way, such that the device would still appear as powered off from the outside since the user interface including visual display, sound interfaces and further elements may be deactivated. Also, certain functions may be activated in this mode that are not used in standard (first) operation mode.

Next, the first device may in step 106 of FIG. 2 communicate several current supply options to the connected first device. In the example shown, three possible configurations are presented: a very low current, a limited current and a maximum current. In accordance with the current USB 2.0 standard taken as an example, the maximum current supplied via the power line VBus is 500 mA for an enumerated device on a self-powered hub. 100 mA may be provided in certain other cases, such as on a bus-powered hub, where the sum of currents supplied to all connected devices may not exceed 500 mA. Thus, in this example 500 mA is given as the maximum current option, 100 mA as the limited current option and a very low trickle current of 8 mA as a third option. One of the possible configurations may be defined as a default configuration value at the first device. To ensure that the device can draw as much power as possible, the highest value may be defined as a default value, but other configurations and default values are possible as well. In addition to current supply values, other parameters and configuration values may be communicated. These may e.g. be parameters needed for enumeration or for performing any functions that should be activated on attaching the device to a host/hub. If a connected device cannot provide sufficient current, for example because of further devices attached and limiting the remaining available current or because it is battery-powered itself and can inherently only supply a limited current, it may select a lower current value configuration and communicate this option back to the first device.

For initializing data communication and to enable all functions provided via the serial data bus, the device may in certain embodiments be required to perform an initializing procedure that may be predefined by a standard for the serial bus. Such a procedure may comprise transmission of predetermined parameters and messages, or e.g. certain logic voltage signals to indicate the presence of a device capable of communication via the bus. In the USB standard, the initialization that is triggered by interconnecting two USB compliant devices is referred to as bus enumeration, which is used to identify and manage any device state changes as necessary. Configuration values are exchanged and the device is assigned an address for communication with the host. In various embodiments of the invention and again with reference to the flow chart of FIG. 2, the second device (such as a USB host) will enumerate the first device by selecting one of the configurations received in step 108.

In certain embodiments, a USB device may enumerate (step 110) as a USB mass storage device, that is, using the communication protocols according to the USB mass storage device class. The USB mass storage device class provides a convenient interface for accessing data on a device via a USB connection using e.g. SCSI transparent commands in some embodiments. Since many devices support this protocol class, especially personal computers (PCs) and laptops, this is also an easy way for using basic mass storage functionalities of a USB device that may nevertheless be capable of providing a variety of further USB and non-USB functionalities. These further functionalities may or may not be active in the second operation mode that is entered when connecting the deactivated (unpowered) device. For further details of the mentioned example of the USB mass storage class, reference is made to the "Universal Serial Bus mass storage class specification overview", USB implementers forum, version 1.2 of June 2003, and the respective specification documents referenced in this overview. As before, the invention is not limited to this protocol class or the USB standard, but rather encloses any serial data bus interface. Thus, other protocols and initializing procedures may be used in those cases without departing from the scope of the invention.

This may have various effects. For example, the first device 2 would now be able to charge (step 114) its battery using the maximum current according to the used serial bus standard, as it has initialized communication in step 110 in a predefined way (such as a USB enumeration) with the power supplying second device. Furthermore, the second device 4 may have partial or even full access (step 116) to storage elements of the first device, such as memory cards inserted in a card slot of the first device. If no card is inserted in such a slot, the device may optionally act as a card reader with an empty card slot from the viewpoint of the accessing first device. Similar functions may be used to automatically update data or software of the first device when connecting it, although it is powered off when the serial interface cable is attached. A memory card that is inserted in a card slot of the first device may be additionally protected by a password, such that access is prevented in this case.

Within the first device, the charging and memory access according to exemplary embodiments of the invention may be performed in various ways. As stated above, a device may include several software and hardware modules for different functions. A energy management unit 12 may comprise a software module that provides for charging of the battery and performs functions concerning energy management, such as charging algorithms, overheating protection/monitoring, and so on. It may further comprise circuitry, such as application-specific integrated circuits, that are used on the hardware side for charging the batteries, thus comprising switching circuits, detection circuits and other suitable elements. Detection of the attachment and the voltage supplied on the serial data bus connector may be achieved by detection circuitry implemented in various ways, such as resistor based detection of high and low logic states, logic gates, and other elements known in the art.

If the battery level of the first device is at first completely discharged or too low to allow entering of the second operation mode, the device may use the supplied current of e.g. 100 mA maximum for charging the battery and then automatically start the wake up process of starting up the processor and entering the second operation mode as described above when the battery level is above a certain required level.

Another software based controlling module may be responsible for handling the detection of an attached host, processing signals of the serial data bus interface, providing communication to the user interface about connections and functions, or to the energy management unit for options and configurations regarding e.g. available charging current. Using such a case as an example embodiment, the controlling module may determine that a charging possibility is given by an attached device and perform the initialization/enumeration process as described above. Subsequently, the received selected configuration value or values may be transferred from the controlling module to the energy management unit, thus informing the energy management unit of the charging option and the maximum current that may be drawn for charging. In response to this information, the energy management unit may initiate charging of the battery according to the received current values and further options. Certain embodiments of the invention may include the energy management unit indicating (step 118 in FIG. 2) a charging state (such as "charging" or "battery fully charged") as text or a symbol on a display of the device.

Due to the initialization or enumeration, optionally as a USB mass storage device, the corresponding USB host now has full access to the phone's memory, such as a inserted memory card. It should be appreciated that all possible functions as described above are effected without the need to activate the device by pressing a "on" button or entering an authentication code. The method as described in the exemplary embodiment is initiated by merely attaching a powered second device to the unpowered and deactivated first device via its serial data bus interface.

Many types of devices could use embodiments of the invention. For example, a powered-off mobile phone may be connected to a computer via a serial data bus interface and connector such as USB or another standard for automatically charging its battery and transmitting data stored on memory card, or for updating data (address book, software, ring tones); access to a memory card may optionally be security controlled by password protection for the memory card itself. As another example, a powered-off digital camera attached to a USB port of some other device may start up automatically for transmitting data (pictures, video data) stored in internal or removable memory elements, and may optionally (but not necessarily) charge its battery/batteries at the same time with maximum available current.

Although exemplary embodiments of the present invention have been described, these should not be construed to limit the scope of the appended claims. Those skilled in the art will understand that various modifications may be made to the described embodiments and that numerous other configurations or combinations of any of the embodiments are capable of achieving this same result. Moreover, to those skilled in the various arts, the invention itself will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention.

The invention claimed is:

1. A method comprising
connecting a powered-off first device to a second device via a serial data bus interface, said first device comprising a processor configured to operate said first device in at least a first full operation mode and a second operation mode that has less functionality than the first full operation mode;
detecting a voltage received from said second device at said first device via said serial data bus interface;
in response to detecting said voltage, booting said processor of said powered-off first device to enter said second operation mode and
initiating a communication mode for said serial bus interface in said second operation mode to initiate a charging process for a rechargeable battery of said first device, wherein said charging process uses a current supplied by said second device via said serial data interface,
wherein said second operation mode comprises, without requiring a user to switch said first device on, providing at least one of read and write access to a memory element of said first device via said serial data bus interface to enable at least one of (i) data communication of data stored at said memory element to said second device and (ii) data communication of data from said second device to be stored at said memory element.

2. The method according to 1 wherein said serial data interface is operated according to a Universal Serial Bus Standard (USB) and said initiation of a communication mode comprises initializing data communication with said second device to perform an enumeration according to the Universal Serial Bus standard.

3. The method of claim 2, wherein said enumeration is performed in accordance with USB mass storage device class protocols.

4. The method according to claim 1, wherein said second operation mode comprises
activating at least part of a visual display element; and
displaying a current state of at least one functionality that is provided in said second operation mode.

5. The method according to claim 4, wherein a charging level of the rechargeable battery of said first device is indicated on said visual display element.

6. The method according to claim 1, where operating in the second operation mode comprises operating said processor at a lower clock frequency than when said processor operates in the first operation mode.

7. A device comprising a serial data bus interface, comprising
a power line, a ground line and at least one data line;
said device comprising at least one processing unit configured to operate said device in a first, full operation mode and a second operation mode that has less functionality than the first full operation mode,
a controlling unit configured to detect a voltage at said power line in a powered-off state of said device, and further configured in response to detecting said voltage to boot said processing unit so as to operate said powered-off device in said second operation mode, said processing unit is further configured when said device is operating in said second operation mode to initiate a communication mode for said serial bus interface; and
an energy management unit connected to a rechargeable battery and said processing unit, and arranged to initiate and control when said powered-off device is in said second operation mode a charging process for said rechargeable battery using said serial bus interface after said processing unit initiates said communication mode for said serial bus interface,
wherein said second operation mode comprises, without requiring a user to switch said device on, providing at least one of read and write access for an external device to a memory element of said device via said serial data bus interface to enable at least one of (i) data communication of data stored at said memory element to said external device and (ii) data communication of data from said external device to be stored at said memory element.

8. The device according to claim 7, further comprising a memory card slot, wherein said data storage unit is a removable memory card operably inserted into said memory card slot.

9. The device according to claim 7, wherein said data storage unit is an integrated memory element of said device.

10. The device according to claim 7, wherein said energy management unit comprises circuitry configured to connect or disconnect said battery to said power line of said serial data bus interface.

11. The device according to claim 7, further comprising a visual display connected to said processing unit,
wherein said display is arranged to indicate a current state of at least one functionality provided in said second operation mode.

12. A device according to claim 7, wherein the initiated communication mode enables said device to receive and negotiate charging current options on said serial data bus interface.

13. The device according to claim 7, where operating in the second operation mode comprises operating said processing unit at a lower clock frequency than when said processing unit operates in the first operation mode.

14. A method comprising
connecting a powered-off first device to a second device via a serial data bus interface, said first device comprising a processing unit configured to operate said first device in at least a first full operation mode and a second operation mode that has less functionality than the first full operation mode;
detecting a voltage received from said second device at said first device via said serial data bus interface;
in response to detecting said voltage, booting said processing unit of said powered-off first device to operate in the second operation mode; and
negotiating current supply options with the second device in said second operation mode for charging a battery of the first device and starting charging the battery of the first device with the negotiated current from the second device;
wherein said second operation mode comprises, without requiring a user to switch said first device on, providing at least one of read and write access to a memory element of said first device via said serial data bus interface to enable at least one of (i) data communication of data stored at said memory element to said second device and (ii) data communication of data from said second device to be stored at said memory element.

15. A method according to claim 14, wherein a communication mode for said serial bus interface is initiated in said second operation mode.

16. The method according to claim 14, where operating in the second operation mode comprises operating said processing unit at a lower clock frequency than when said processing unit operates in the first operation mode.

17. A device comprising a serial data bus interface, comprising a power line, a ground line and at least one data line;

said device comprising at least one processing unit configured to operate in a first, full operation mode and a second operation mode that has less functionality than the first, full operation mode, a battery, said device configured to detect a voltage at said power line in a powered-off state of said device, and further configured to boot said processing unit so as to operate said powered-off device in said second operation mode in response to a detected voltage, said processing unit being configured when operating in said second operation mode to negotiate current supply options on said serial data bus interface and being further configured to start charging the battery from the serial data bus interface with the negotiated current;

wherein said second operation mode comprises, without requiring a user to switch said device on, providing at least one of read and write access to a memory element of said device via said serial data bus interface to enable at least one of (i) data communication of data stored at said memory element to an external device and (ii) data communication of data from said external device to be stored at said memory element.

18. The device according to claim 17 wherein the processing unit is further configured to initiate a communication mode for said serial data bus interface in said second operation mode.

19. The device according to claim 17, where operating in the second operation mode comprises operating said processing unit at a lower clock frequency than when said processing unit operates in the first operation mode.

* * * * *